(12) United States Patent
Matsumoto (10) Patent No.: US 9,131,225 B2
(45) Date of Patent: Sep. 8, 2015

(54) VIDEO DISPLAY APPARATUS AND VIDEO DISPLAY METHOD

(71) Applicant: SEIKO EPSON CORPORATION, Tokyo (JP)

(72) Inventor: Morio Matsumoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 200 days.

(21) Appl. No.: 13/788,648

(22) Filed: Mar. 7, 2013

(65) Prior Publication Data

US 2013/0242063 A1 Sep. 19, 2013

(30) Foreign Application Priority Data

Mar. 19, 2012 (JP) ................................. 2012-061795

(51) Int. Cl.
*H04N 13/00* (2006.01)
*H04N 13/04* (2006.01)

(52) U.S. Cl.
CPC ........... *H04N 13/04* (2013.01); *H04N 13/0022* (2013.01); *H04N 13/0459* (2013.01)

(58) Field of Classification Search
CPC .................................................... H04N 13/04
USPC .......................................................... 348/51
See application file for complete search history.

(56) References Cited

U.S. PATENT DOCUMENTS

| 2011/0090323 | A1* | 4/2011 | Shibata | 348/54 |
| 2011/0157164 | A1* | 6/2011 | Suzuki | 345/419 |
| 2011/0169926 | A1 | 7/2011 | Sakaguchi et al. | |
| 2011/0242297 | A1 | 10/2011 | Yamada | |
| 2012/0120210 | A1 | 5/2012 | Yamada | |
| 2013/0094833 | A1* | 4/2013 | Fujita | 386/230 |

FOREIGN PATENT DOCUMENTS

| JP | A-2011-146828 | 7/2011 |
| JP | 2011-211657 A | 10/2011 |
| WO | 2011/162037 A1 | 12/2011 |

* cited by examiner

*Primary Examiner* — Sath V Perungavoor
*Assistant Examiner* — Jeffery William
(74) *Attorney, Agent, or Firm* — Oliff PLC (57) ABSTRACT

A video display apparatus can adjust the parallax level of stereoscopic video images in accordance with the video image size and allows a user to make further parallax adjustment. The video display apparatus acquires the video image size of the stereoscopic video images, sets a default value of a depth adjustment value for adjusting the parallax level of the stereoscopic video images based on the acquired video image size, changes the depth adjustment value when the user has provided an input representing a change in the depth adjustment value, sets a parallax adjustment level of the stereoscopic video images based on the changed depth adjustment value, and adjusts the parallax level of the stereoscopic video images based on the parallax adjustment level.

3 Claims, 10 Drawing Sheets

| VIDEO IMAGE SIZE [INCH] | DEFAULT VALUE OF DEPTH ADJUSTMENT VALUE | PARALLAX ADJUSTMENT LEVEL [PIXEL] | ADJUSTED PARALLAX LEVEL [cm] |
|---|---|---|---|
| 60 | 0 | 0 | 2.8 |
| 70 | 0 | 0 | 3.2 |
| 80 | 0 | 0 | 3.7 |
| 90 | 0 | 0 | 4.2 |
| 100 | 0 | 0 | 4.6 |
| 110 | 0 | 0 | 5.0 |
| 120 | 1 | 8 | 4.4 (5.5) |
| 130 | 1 | 8 | 4.8 (5.9) |
| 140 | 2 | 16 | 3.9 (6.5) |
| 150 | 2 | 16 | 4.1 (6.9) |
| 160 | 2 | 16 | 4.4 (7.3) |
| 170 | 2 | 16 | 4.7 (7.8) |
| 180 | 2 | 16 | 5.0 (8.3) |
| 190 | 3 | 24 | 3.5 (8.7) |
| 200 | 3 | 24 | 3.7 (9.2) |
| 210 | 3 | 24 | 3.9 (9.6) |
| 220 | 3 | 24 | 4.1 (10.1) |
| 230 | 3 | 24 | 4.3 (10.5) |
| 240 | 3 | 24 | 4.5 (11) |
| 250 | 3 | 24 | 4.7 (11.5) |
| 260 | 3 | 24 | 4.8 (11.9) |
| 270 | 3 | 24 | 5.0 (12.4) |
| 280 | 4 | 32 | 2.6 (12.8) |
| 290 | 4 | 32 | 2.7 (13.3) |
| 300 | 4 | 32 | 2.8 (13.7) |

| VIDEO IMAGE SIZE [INCH] | DEFAULT VALUE OF DEPTH ADJUSTMENT VALUE | PARALLAX ADJUSTMENT LEVEL [PIXEL] | ADJUSTED PARALLAX LEVEL [cm] |
|---|---|---|---|
| 60 | 0 | 0 | 2.8 |
| 70 | 0 | 0 | 3.2 |
| 80 | 0 | 0 | 3.7 |
| 90 | 0 | 0 | 4.2 |
| 100 | 0 | 0 | 4.6 |
| 110 | 0 | 0 | 5.0 |
| 120 | 0 | 8 | 5.5 |
| 130 | 0 | 8 | 5.9 |
| 140 | 1 | 8 | 5.2 (6.5) |
| 150 | 1 | 8 | 5.5 (6.9) |
| 160 | 1 | 8 | 5.8 (7.3) |
| 170 | 2 | 16 | 4.7 (7.8) |
| 180 | 2 | 16 | 5.0 (8.3) |
| 190 | 2 | 16 | 5.2 (8.7) |
| 200 | 2 | 16 | 5.5 (9.2) |
| 210 | 2 | 16 | 5.7 (9.6) |
| 220 | 2 | 16 | 6.0 (10.1) |
| 230 | 3 | 24 | 4.3 (10.5) |
| 240 | 3 | 24 | 4.5 (11) |
| 250 | 3 | 24 | 4.7 (11.5) |
| 260 | 3 | 24 | 4.8 (11.9) |
| 270 | 3 | 24 | 5.0 (12.4) |
| 280 | 3 | 24 | 5.1 (12.8) |
| 290 | 3 | 24 | 5.3 (13.3) |
| 300 | 3 | 24 | 5.4 (13.7) |

VIDEO DISPLAY APPARATUS AND VIDEO DISPLAY METHOD

BACKGROUND

1. Technical Field

The present invention relates to a video display apparatus that displays stereoscopic video images and a video display method.

2. Related Art

There is a known image reproduction apparatus of related art that provides an audience/viewer with a 3D image intended by a producer thereof irrespective of an audio/visual environment by reproducing the 3D image with the parallax level adjusted in accordance with the audio/visual environment. For example, in consideration of the fact that the parallax level of a 3D image reproduced on a screen of a certain size (video image size) is greater than the parallax level of the same 3D image reproduced on a screen of a smaller size, the image reproduction apparatus acquires the screen size as audio/visual environment information and adjusts the parallax level to be the same parallax level of the 3D image reproduced on a screen of an intended size (see JP-A-2011-146828).

The image reproduction apparatus of the related art, however, only adjusts the parallax in such a way that a 3D image intended by the producer thereof is reproduced but is not intended to further allow a user to adjust the parallax level. In this case, even when the screen size is acquired as the audio/visual environment information and the parallax level is adjusted to be the same parallax level of the 3D image reproduced on a screen of an intended size as described above, a user who desires to look at the 3D image having a smaller parallax level is inconveniently forced to look at the 3D image having a greater parallax level that differs from the user's preference.

SUMMARY

An advantage of some aspects of the invention is to provide a video display apparatus capable of not only adjusting the parallax level of stereoscopic video images in accordance with the video image size but also allowing a user to make further parallax adjustment. Another advantage of some aspects of the invention is to provide a video display method.

An aspect of the invention is directed to a video display apparatus including a video image size acquisition section that acquires a video image size of stereoscopic video images, a default value setting section that sets a default value of a parallax level adjustment value for adjusting a parallax level of the stereoscopic video images based on the acquired video image size, an adjustment value changing section that changes the parallax level adjustment value from the default value, a parallax adjustment level setting section that sets a parallax adjustment level of the stereoscopic video images based on the parallax level adjustment value, and a parallax level adjustment section that adjusts the parallax level of the stereoscopic video images based on the set parallax adjustment level.

Another aspect of the invention is directed to a video display method including acquiring a video image size of stereoscopic video images, setting a default value of a parallax level adjustment value for adjusting a parallax level of the stereoscopic video images based on the acquired video image size, changing the parallax level adjustment value from the default value, setting a parallax adjustment level of the stereoscopic video images based on the parallax level adjustment value, and adjusting the parallax level of the stereoscopic video images based on the set parallax adjustment level.

According to the configurations described above, a default value of the parallax level adjustment value is set based on the video image size of stereoscopic video images. When the user does not desire to make further parallax adjustment, the parallax adjustment level of the stereoscopic video images is set based on the default value of the parallax level adjustment value. The parallax level of the stereoscopic video images is then adjusted based on the thus set parallax adjustment level. The parallax level of the stereoscopic video images can thus be adjusted in accordance with the video image size. Further, when the user desires to make further parallax adjustment, the user is allowed to change the parallax level adjustment value from the default value, and the parallax adjustment level of the stereoscopic video images is set based on the changed parallax level adjustment value. The parallax level of the stereoscopic video images is then adjusted based on the thus set parallax adjustment level. In this way, the user can change the parallax level in accordance with user's preference from the parallax level adjusted in accordance with the video image size. As described above, the parallax level of stereoscopic video images can be adjusted in accordance with the video image size, and the user can make further parallax adjustment.

In this case, it is preferable that the default value setting section preferably sets the default value in such a way that the parallax level decreases when the acquired video image size exceeds a predetermined threshold.

According to the configuration described above, in view of the fact that the parallax level of a stereoscopic video image having a greater video image size is greater than the parallax level of the same stereoscopic video image having a smaller video image size, the default value of the parallax level adjustment value is not changed when the acquired video image size is smaller than or equal to the threshold because the parallax level is not so large, whereas when the acquired video image size is greater than the threshold, the default value of the parallax level adjustment value is so chanted that the parallax level decreases because the parallax level is large. Parallax adjustment can thus be made as required.

In this case, it is preferable that the threshold is a value according to which whether or not the parallax level exceeds an interpupillary distance is determined.

According to the configuration described above, the default value of the parallax level adjustment value can be so set that the parallax level of the stereoscopic video images does not exceed the interpupillary distance.

In this case, it is preferable that the video display apparatus further includes a user information acquisition section that acquires user information on a user, and the default value setting section preferably sets the default value based on the acquired video image size and the acquired user information.

According to the configuration described above, the user's age is, for example, acquired as the user information, and when the acquired age shows that the user is a child, the default value of the parallax level adjustment value can be so changed that the parallax level decreases even when the acquired video image size is relatively small and hence the parallax level is not so large, whereas when the acquired age shows that the user is an adult and when the acquired video image size is relatively small and hence the parallax level is not so large, the default value of the parallax level adjustment value can be so set that the parallax level remains unchanged. As described above, parallax adjustment according to the characteristics of the user can be made.

BRIEF DESCRIPTION OF THE DRAWINGS

The invention will be described with reference to the accompanying drawings, wherein like numbers reference like elements.

DESCRIPTION OF EXEMPLARY EMBODIMENTS

A video display apparatus and a video display method according to an embodiment of the invention will be described below with reference to the accompanying drawings. In the present embodiment, a projector is presented by way of example of the video display apparatus. The projector displays video images on a screen or any other surface in such a way that they are recognized as stereoscopic video images by displaying (projecting) video images for the right eye and video images for the left eye each being a two-dimensional video image and having parallax therebetween. Stereoscopic video images are not necessarily displayed in a specific form. For example, video images for the right eye and video images for the left eye may alternately be displayed (frame sequential method) for a user who wears active shutter glasses (liquid crystal shutter glasses), or video images for the right eye and video images for the left eye may simultaneously be displayed for a user who wears polarization filter or color filter glasses.

Figure 1:
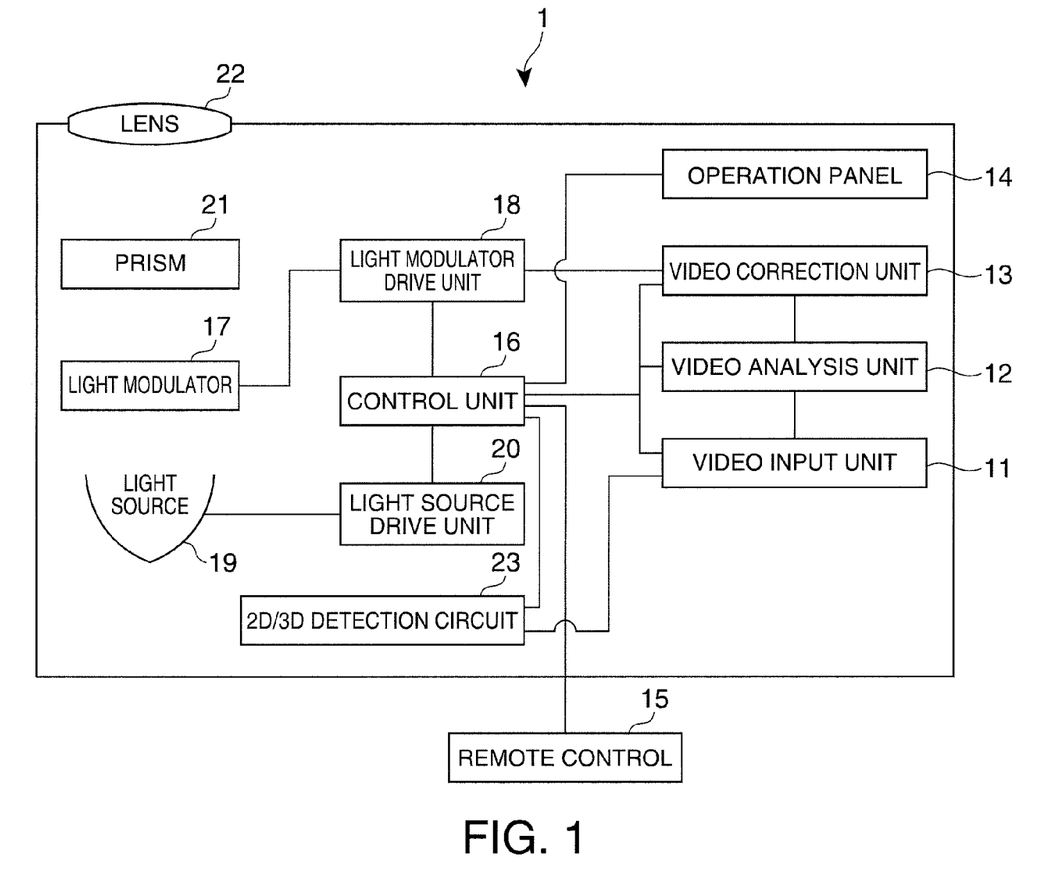
FIG. 1 is a configuration diagram of a projector according to an embodiment of the invention.

A projector 1 includes a video input unit 11, a video analysis unit 12, a video correction unit 13, an operation panel 14, a remote control 15, a control unit 16, a light modulator 17, a light modulator drive unit 18, a light source 19, a light source drive unit 20, a prism 21, a lens 22, and a 2D/3D detection circuit 23, as shown in FIG. 1.

The video input unit 11 receives video data from a personal computer, a video player, or any other external apparatus or a USB memory or any other external storage medium. The inputted video data contains 2D/3D identification information representing whether the inputted content is two-dimensional video images or stereoscopic video images.

The video analysis unit 12 performs edge detection for sharpness enhancement and histogram analysis for brightness correction based on the video data inputted to the video input unit 11.

The video correction unit 13 performs sharpness correction, brightness correction, and other types of correction on the video data inputted to the video input unit 11 based on analysis results from the video analysis unit 12 and outputs the resultant video data to the light modulator drive unit 18.

The operation panel 14 is provided on the body of the projector 1 and has a group of operation parts for various types of operation. The group of operation parts include a power on/off button, a menu button for displaying an environment setting menu, such as a video image size setting menu and a depth adjustment value setting menu, which will be described later, in an OSD (on-screen display) mode, a selection button for selecting a variety of items, for example, in the environment setting menu, and a return button for finalizing a selected item. The remote control 15 is provided to remotely operate the body of the projector 1 and has a group of various operation parts as the operation panel 14 does.

The control unit 16, which includes a CPU (central processing unit) that performs various types of computation; a ROM (read only memory) that stores an OS (operating system), which is basic software, and control programs and control data used by the CPU to perform the computation; and a RAM (random access memory) used as a work area when the CPU performs the various types of computation, oversees and controls the projector 1.

The light modulator 17 is formed of three liquid crystal light valves corresponding to RGB three colors and modulates projection light from the light source 19. The light modulator drive unit 18 sets light transmittance of each pixel in each of the liquid crystal light valves by applying a drive voltage according to the video signal corrected by the video correction unit 13 to the pixel. The light source drive unit 20 supplies electric power to the light source 19 formed of a lamp, turns the light source 19 on and off, and adjusts the amount of light emitted therefrom. The prism 21 combines RGB three-color modulated light fluxes modulated by the light modulator 17. The lens 22 focuses combined projection video images from the prism 21 on a screen or any other surface.

The 2D/3D detection circuit 23 refers to the 2D/3D identification information contained in the video signal inputted to the video input unit 11, detects whether the inputted video signal contains two-dimensional video images or stereoscopic video images, and outputs the detection result to the control unit 16.

Figure 2:
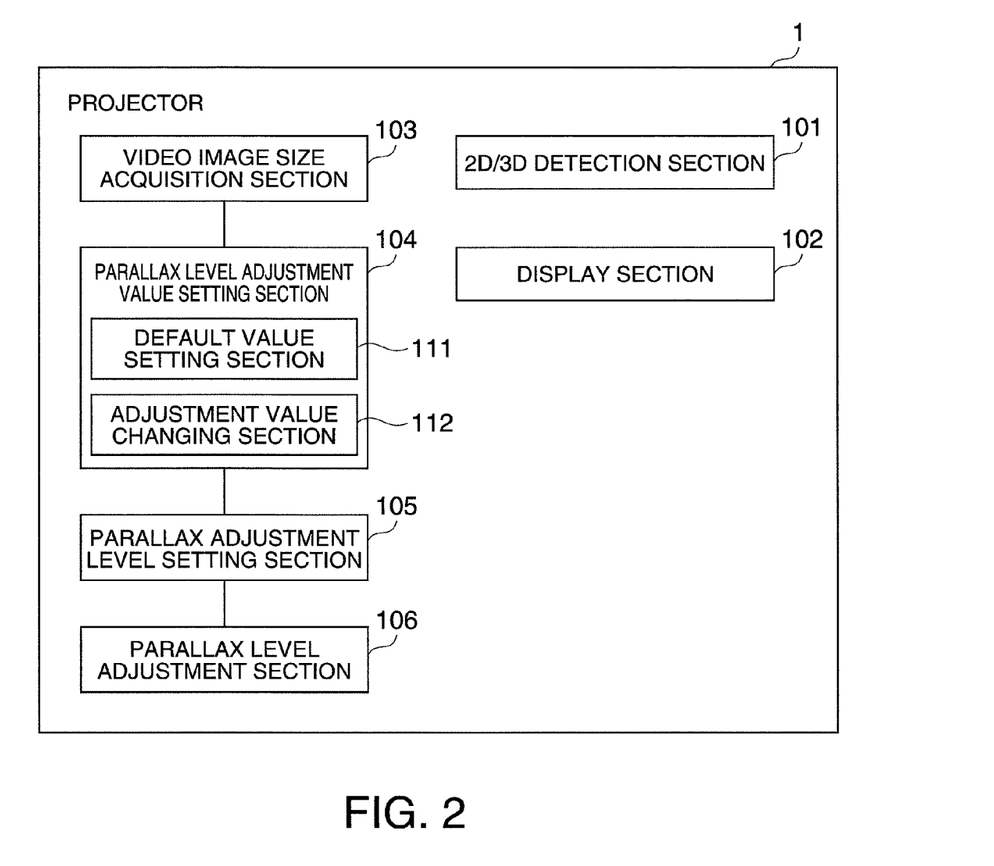
FIG. 2 is a functional block diagram of a projector according to a first embodiment.

A functional configuration of the projector 1 will be described with reference to FIG. 2. The projector 1 includes a 2D/3D detection section 101, a display section 102, a video image size acquisition section 103, a parallax level adjustment value setting section 104, a parallax adjustment level setting section 105, and a parallax level adjustment section 106.

The 2D/3D detection section 101 detects whether an inputted video signal contains two-dimensional video images or stereoscopic video images and includes the 2D/3D detection circuit 23 as a key component. The display section 102 displays (projects) video images based on the inputted video signal and includes the light modulator 17, the light modulator drive unit 18, the light source 19, the light source drive unit 20, the prism 21, and the lens 22 as key components.

Figure 3:
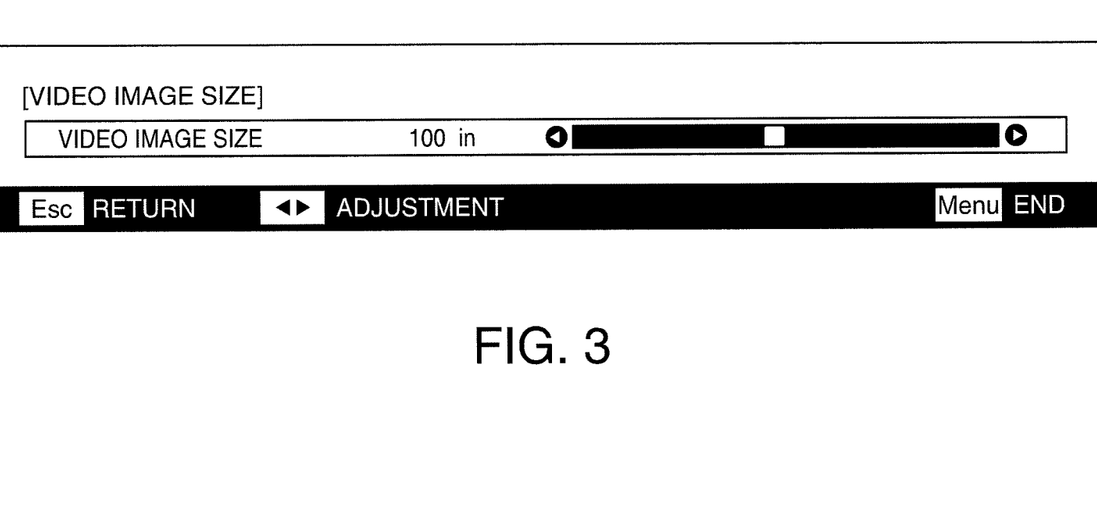
FIG. 3 shows an example of a video image size setting menu.

The video image size acquisition section 103 acquires the video image size (projection size) by prompting the user to input the video image size in the environment setting menu. More specifically, the video image size acquisition section 103 acquires the video image size by displaying a video image size setting menu, such as the one shown in FIG. 3, and prompting the user to input a video image size according to the size or any other factor of the screen or any other surface. A settable video image size ranges from 60 to 300 inches at 10-inch intervals. A default video image size is 100 inches.

The video image size acquisition section 103 does not necessarily have the configuration in the present embodiment, in which the user is prompted to input the video image size, but may, for example, have a configuration in which a video image displayed on the screen or any other surface is captured and the video image size is acquired based on the captured image or a configuration in which the video image size is determined based on the zooming state of a projected video image and the projection distance from the projector 1 to the projected video image (screen or any other surface).

The parallax level adjustment value setting section 104, which will be described later in detail, sets a depth adjustment value as a parallax level adjustment value for adjusting the parallax level of stereoscopic video images. The depth adjustment value is used to adjust the depth of stereoscopic video images. A settable depth adjustment value ranges from −10 to +10, 21 steps in total, and one step of the depth adjustment value corresponds to a parallax level of 8 pixels.

Figure 4A:
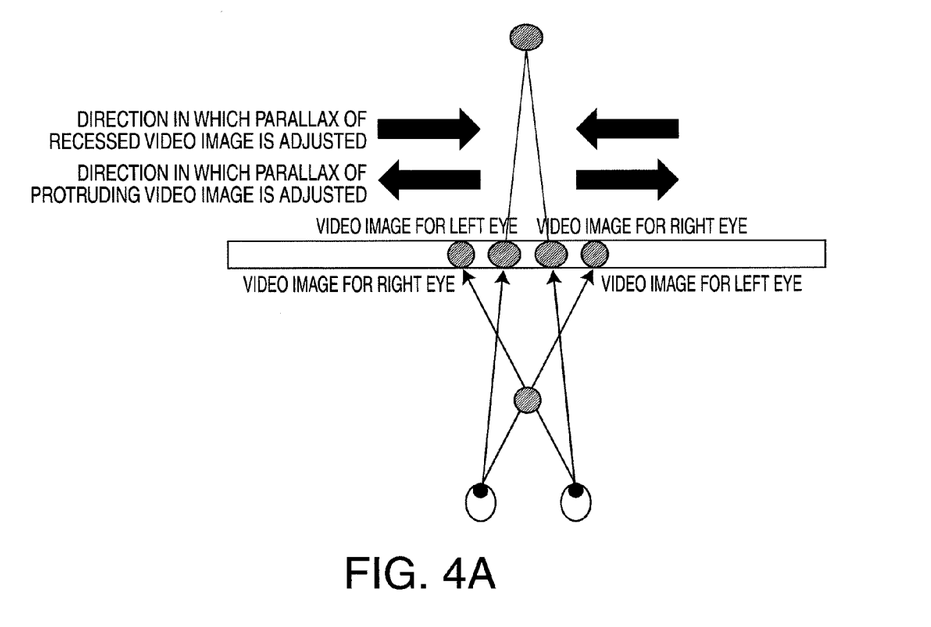
FIG. 4A describes parallax level adjustment made when a positive depth adjustment value is set, and FIG. 4B describes parallax level adjustment made when a negative depth adjustment value is set.
Figure 4B:
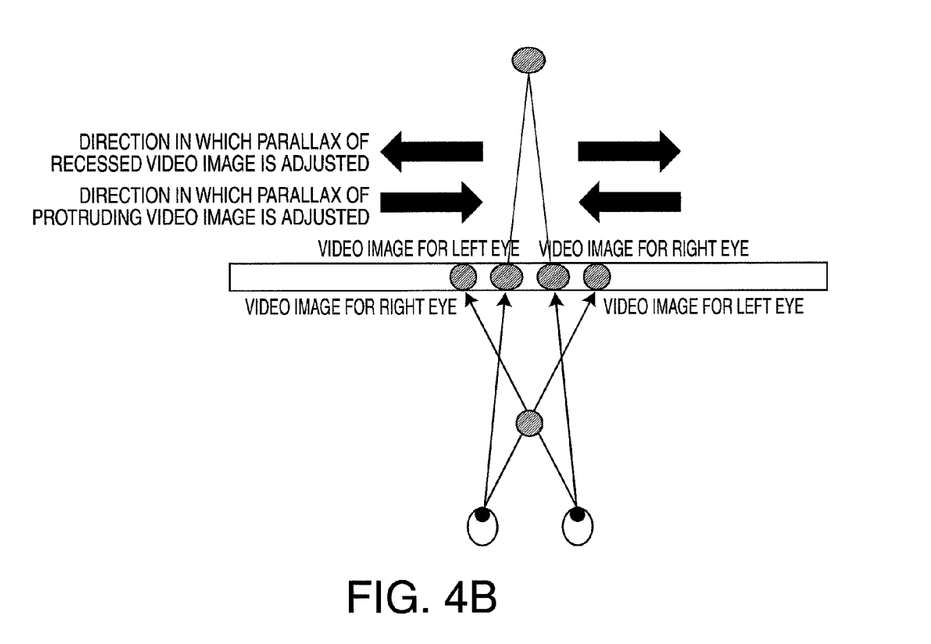

The parallax adjustment level setting section 105, which includes the video correction unit 13 as a key component, sets a parallax adjustment level based on the depth adjustment value set by the parallax level adjustment value setting section 104. When the parallax level adjustment value setting section 104 sets a positive depth adjustment value, the parallax adjustment level setting section 105 sets a parallax adjustment level of a protruding stereoscopic video image in such a way that the amount of protrusion, that is, the parallax level increases, whereas setting a parallax adjustment level of a recessed stereoscopic video image in such a way that the amount of recess, that is, the parallax level decreases (see FIG. 4A). Conversely, when the parallax level adjustment value setting section 104 sets a negative depth adjustment value, the parallax adjustment level setting section 105 sets a parallax adjustment level of a protruding stereoscopic video image in such a way that the amount of protrusion, that is, the parallax level decreases, whereas setting a parallax adjustment level of a recessed stereoscopic video image in such a way that the amount of recess, that is, the parallax level increases (see FIG. 4B). More specifically, when the depth adjustment value set by the parallax level adjustment value setting section 104 is +2, the parallax adjustment level setting section 105 sets a parallax adjustment level of a recessed stereoscopic video image in such a way that the parallax level decreases by 16 pixels.

The parallax level adjustment section 106, which includes the video correction unit 13 as a key component, adjusts the parallax level of stereoscopic video images based on the parallax adjustment level set by the parallax adjustment level setting section 105.

In the present embodiment, in which the depth adjustment value is used as the parallax level adjustment value for adjusting the parallax level of stereoscopic video images, the depth adjustment value is not necessarily used as the parallax level adjustment value and a parallax adjustment value may, for example, be used as the parallax level adjustment value. The parallax adjustment value is used to directly adjust the parallax level of stereoscopic video images. When the parallax level adjustment value setting section 104 sets a positive parallax adjustment value, the parallax adjustment level setting section 105 sets a parallax adjustment level that increases the parallax level, whereas when the parallax level adjustment value setting section 104 sets a negative parallax adjustment value, the parallax adjustment level setting section 105 sets a parallax adjustment level that increases the parallax level.

The parallax level adjustment value setting section 104 includes a default value setting section 111 and an adjustment value changing section 112. The default value setting section 111 sets a default value (initial value) of the depth adjustment value based on the video image size acquired by the video image size acquisition section 103 and includes the control unit 16 as a key component.

The default depth adjustment value set by the default value setting section 111 is so set that the parallax level of stereoscopic video images does not exceed 5 cm, which is an average interpupillary distance of children. More specifically, since the eyes of a person who is looking at recessed stereoscopic video images do not move outward, it is believed that the parallax level does not desirably exceed, to the extent possible, the interpupillary distance. On the other hand, the parallax level of a stereoscopic video image having a greater video image size is greater than the parallax level of the same stereoscopic video image having a smaller video image size. For example, consider a case where a stereoscopic video image is produced assuming that the angle of parallax is 0.7 degrees and a projected video image size is 60 inches, and the parallax level is set at 2.8 cm. In this case, increasing the video image size to 110 inches increases the parallax level to 5.0 cm, and increasing the video image size to 120 inches increases the parallax level to 5.5 cm, which is greater than 5 cm, which is the average interpupillary distance of children (see FIG. 5, in which the values in the parentheses in the field of the adjusted parallax level are parallax levels of recessed video images calculated when the depth adjustment value is 0).

When the video image size acquired by the video image size acquisition section 103 exceeds 110 inches, which is assumed to be a video image size threshold for determining whether or not the parallax level of the stereoscopic video images exceeds the average interpupillary distance of children, the default value setting section 111 sets a positive default depth adjustment value so that the parallax level of recessed stereoscopic video images decreases. That is, the default value setting section 111 not only creates a depth adjustment value setting table in which video image sizes and default depth adjustment values are related to each other based on video image sizes, parallax levels, and other factors intended by the producer of the stereoscopic video images, such as the one shown in FIG. 5, but also refers to the thus created depth adjustment value setting table to set a default value based on the video image size acquired by the video image size acquisition section 103.

Figure 5:
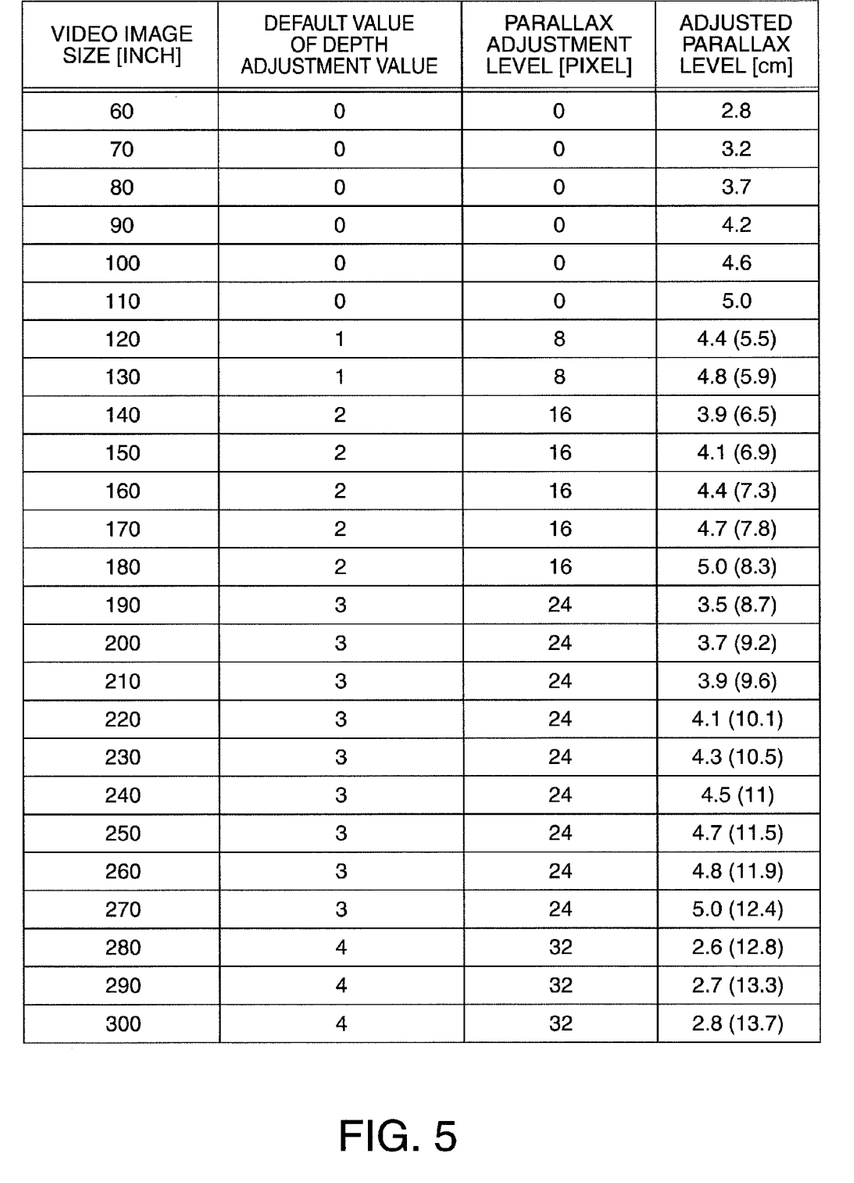
FIG. 5 shows an example of a depth adjustment value setting table.

When the acquired video image size is smaller than or equal to 110 inches, which allows the parallax level to be smaller than or equal to the interpupillary distance of children, the default value of the depth adjustment value does not need to be changed (default value is zero), whereas when the acquired video image size is greater than 110 inches, which causes the parallax level to be greater than the interpupillary distance of children, the default value of the depth adjustment value is changed to a positive value so that the parallax level decreases. The parallax adjustment is thus made as required.

Figure 6:
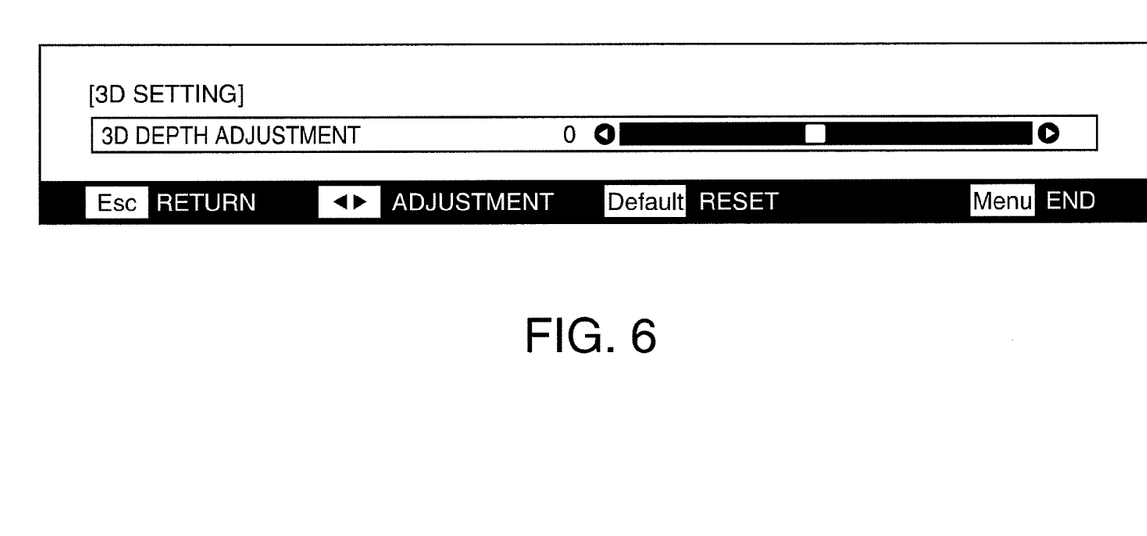
FIG. 6 shows an example of a depth adjustment value setting menu.

The adjustment value changing section 112 allows the user to change the depth adjustment value in the environment setting menu in such a way that the amount of depth of stereoscopic video images matches user's preference. More specifically, the adjustment value changing section 112 first displays a default depth adjustment value set by the default value setting section 111 in a depth adjustment value setting menu, such as the one shown in FIG. 6, then prompts the user to input a depth adjustment value, which ranges from −10 to +10, 21 steps in total, and changes the depth adjustment value from the default value set by the default value setting section 111 based on the input.

Figure 7:
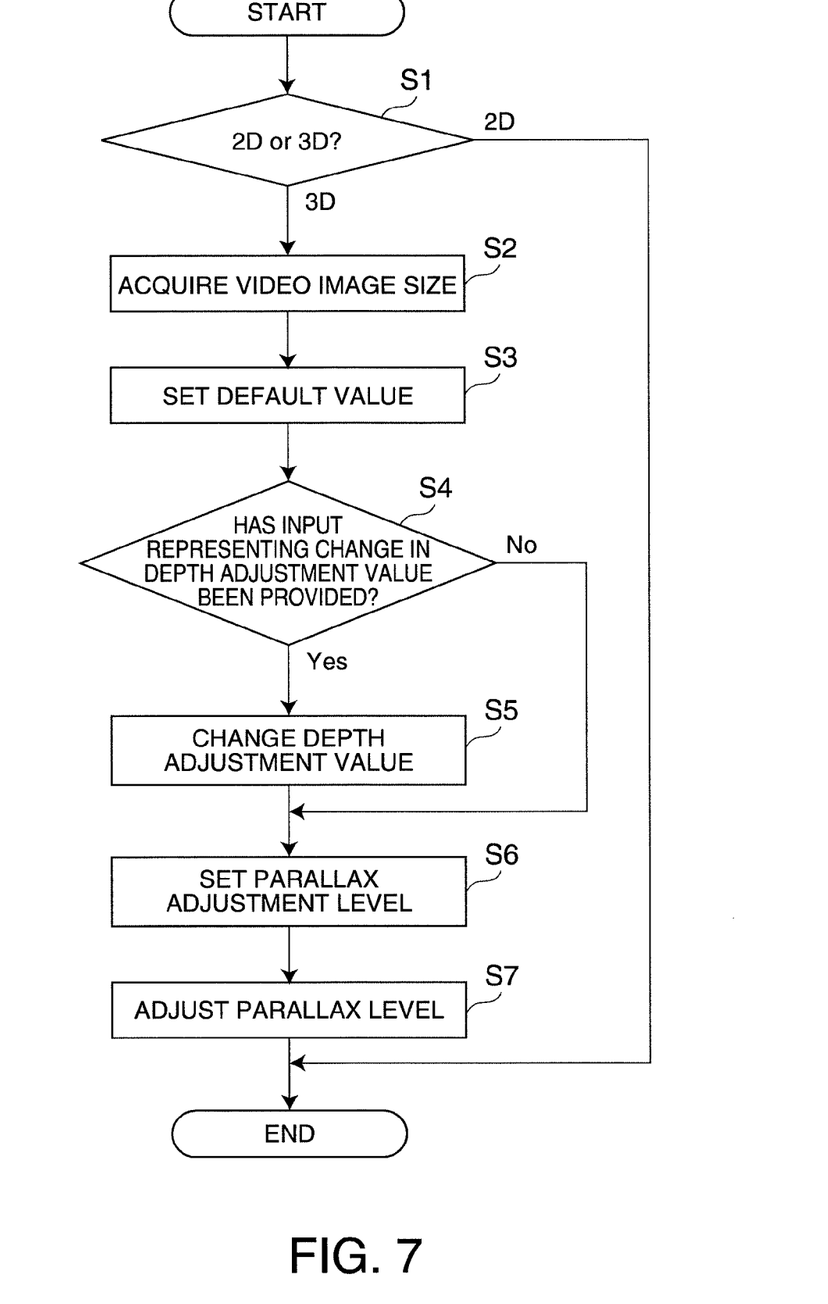
FIG. 7 is a flowchart showing the procedure of parallax adjustment performed by the projector according to the first embodiment.

The procedure of the parallax adjustment performed by the projector 1 according to the first embodiment will be described with reference to FIG. 7. In the projector 1, the 2D/3D detection section 101 first detects whether an inputted video signal contains two-dimensional video images or stereoscopic video image (S1). When the 2D/3D detection section 101 detects that the inputted video signal contains two-dimensional video images (S1; 2D), the projector 1 terminates the procedure.

On the other hand, when the 2D/3D detection section 101 detects that the inputted video signal contains stereoscopic video images (S1; 3D), the video image size acquisition section 103 acquires the video image size of the stereoscopic video images (S2). The default value setting section 111 subsequently refers to the depth adjustment value setting table and sets a default value of the depth adjustment value based on the video image size acquired by the video image size acquisition section 103 (S3).

When the user subsequently provides an input representing a change in the depth adjustment value in the depth adjustment value setting menu (S4; Yes), the adjustment value changing section 112 changes the depth adjustment value from the default value based on the input result (S5). The parallax adjustment level setting section 105 subsequently sets a parallax adjustment level based on the changed depth adjustment value (S6). The parallax level adjustment section 106 then adjusts the parallax level of the stereoscopic video images based on the parallax adjustment level set by the parallax adjustment level setting section 105 (S7), and the procedure is completed. On the other hand, when the user has provided no input representing a change in the depth adjustment value (S4; No), the parallax adjustment level setting section 105 sets a parallax adjustment level based on the default depth adjustment value set by the default value setting section 111 (S6), the parallax level adjustment section 106 adjusts the parallax level of the stereoscopic video images based on the parallax adjustment level set by the parallax level adjustment section 106 (S7), and the procedure is completed. It is noted that the input representing a change in the depth adjustment value provided by the user may be provided by the user before the stereoscopic video images are displayed or in the course of display of the stereoscopic video images. In the latter case, the projector 1 temporarily displays video images having undergone the parallax adjustment based on the default value of the depth adjustment value (parallax level has been changed to a level smaller than or equal to interpupillary distance), receives an input representing a change in the depth adjustment value in the course of display of the video images, and displays video images with the parallax level decreased or increased based on the inputted depth adjustment value.

As described above, the projector 1 according to the present embodiment sets a default value of the depth adjustment value based on the video image size of stereoscopic video images. Thereafter, when the user does not desire to make further parallax adjustment (depth adjustment), the projector 1 sets a parallax adjustment level of the stereoscopic video images based on the default value of the depth adjustment value, whereby the parallax level of the stereoscopic video images can be so adjusted that the parallax level does not exceed the interpupillary distance even when the video image size is large. On the other hand, when the user desires to make further parallax adjustment, the user is allowed to change the depth adjustment value from the default value, and a parallax adjustment level of the stereoscopic video image is set based on the changed depth adjustment value. The parallax level of the stereoscopic video images is then adjusted based on the thus set parallax adjustment level. In this way, the user can change the parallax level in accordance with user's preference from the parallax level adjusted in accordance with the video image size. As described above, the parallax level of stereoscopic video images can be so adjusted in accordance with the video image size that the parallax level does not exceed the interpupillary distance, and the user can make further parallax adjustment.

A projector according to a second embodiment of the invention will next be described. The projector according to the second embodiment has substantially the same configuration as that in the first embodiment described above but differs therefrom in that the default depth adjustment value is settable in accordance with the user's age. Features of the second embodiment that differ from those of the first embodiment will be primarily described below. In the present embodiment, the same components as those in the first embodiment have the same reference characters, and no description thereof will be made in detail. Further, the variations applied to components in the first embodiment are also applied to the same components in the present embodiment.

Figure 8:
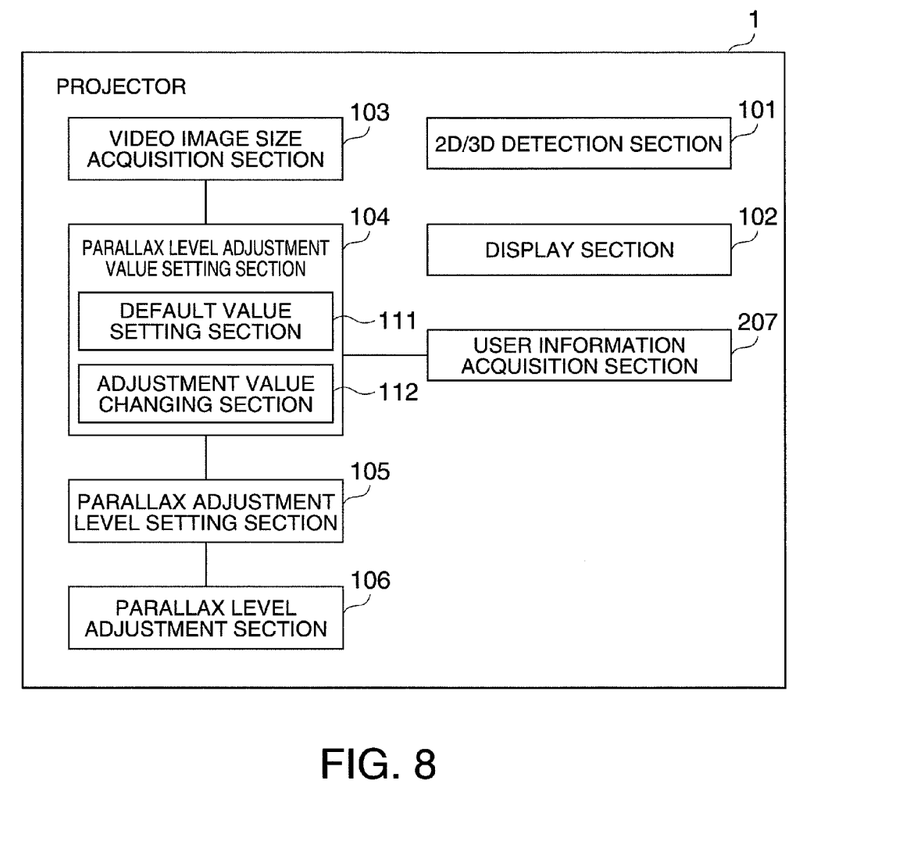
FIG. 8 is a functional block diagram of a projector according to a second embodiment.

The projector 1 according to the second embodiment includes a user information acquisition section 207 as well as the sections in the first embodiment, as shown in FIG. 8. The user information acquisition section 207 prompts the user to input the age of the user himself/herself (youngest user when there are multiple users) and includes the operation panel 14, the remote control 15, and the display section 102 as key components. More specifically, the user information acquisition section 207 displays not only a message of "Input your age. When there are multiple viewers, input the age of the youngest person" but also a field where the age can be inputted and acquires the age of the user based on the inputted value. The user information acquisition section 207 may alternatively be configured to prompt the user to input the interpupillary distance of the user instead of the user's age or capture an image of the user's face and acquire the interpupillary distance of the user based on the captured image.

In the second embodiment, the default value setting section 111 sets a default value of the depth adjustment value based not only on the video image size acquired by the video image size acquisition section 103 but also on the user's age acquired by the user information acquisition section 207. More specifically, consider a case where a stereoscopic video image is produced assuming that the angle of parallax is 0.7 degrees and a projected video image size is 60 inches, and the parallax level is set at 2.8 cm. Increasing the video image size to 120 inches increases the parallax level to 5.5 cm, which is greater than 5 cm, which is the average interpupillary distance of children. Now, redefine the video image size threshold, which determines whether or not the parallax level of stereoscopic video images exceeds the average interpupillary distance of "children" (5 cm) and is 110 inches as described above, as a value for determining whether or not the parallax level of stereoscopic video images exceeds an average interpupillary distance of "adults" (6 cm). In this case, the threshold is 130 inches (see FIG. 5).

Figure 9:
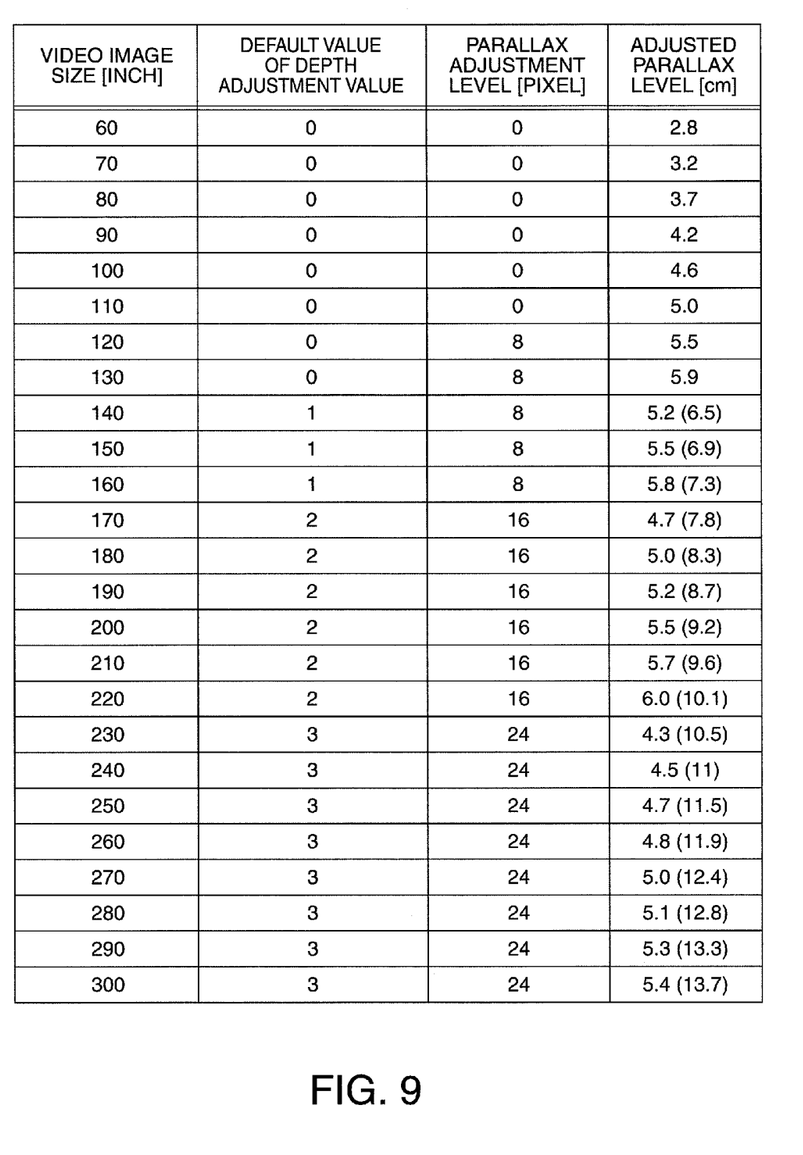
FIG. 9 shows another example of the depth adjustment value setting table.

When the user's age acquired by the user information acquisition section 207 shows that the user is a child (below 15 years old, for example), the default value setting section 111 creates a depth adjustment value setting table, such as the one shown in FIG. 5, and when the acquired video image size exceeds 110 inches, the default value setting section 111 sets a positive default depth adjustment value so that the parallax level decreases. On the other hand, when the user's age acquired by the user information acquisition section 207 shows that the user is an adult (15 years old or older, for example), the default value setting section 111 creates a depth adjustment value setting table, such as the one shown in FIG. 9, and when the acquired video image size exceeds 130 inches, the default value setting section 111 sets a positive default depth adjustment value so that the parallax level decreases. When the user information acquisition section 207 has acquired no user's age (when the user has inputted no age), the default value setting section 111 preferably carries out the same process as that carried out when a child age is acquired for safety reasons.

Figure 10:
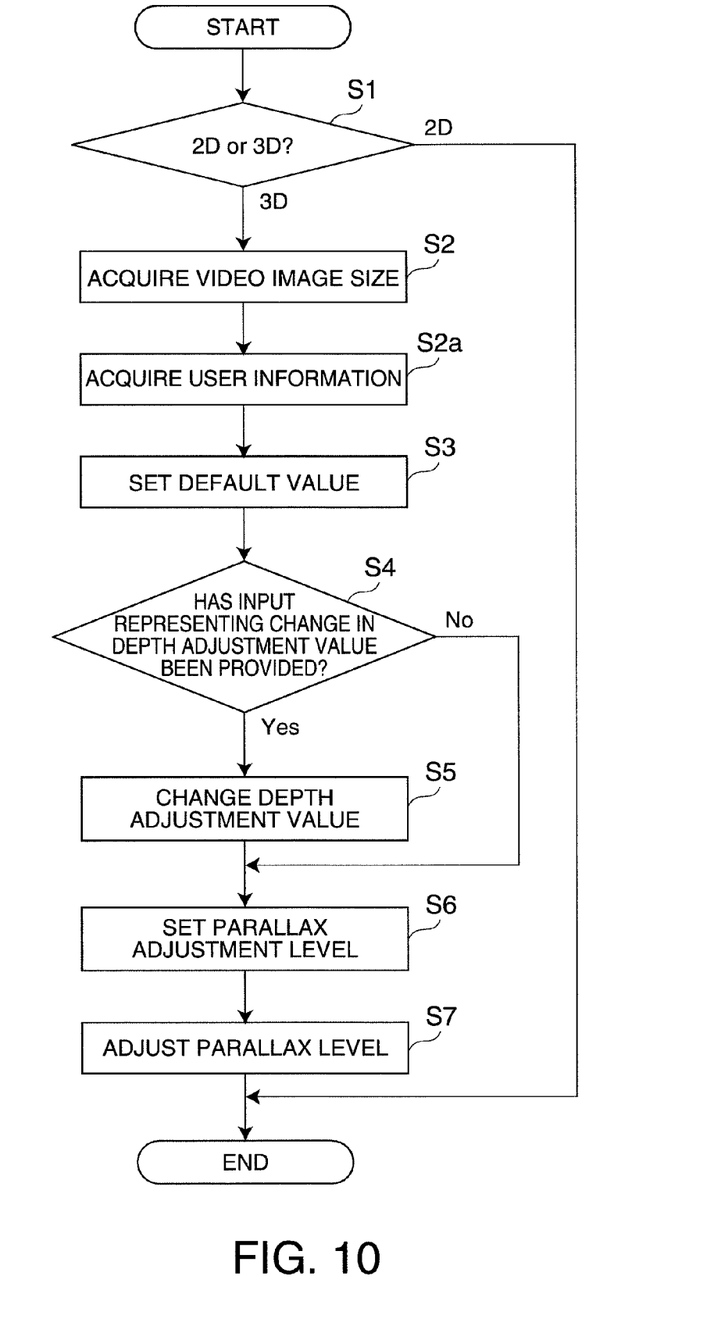
FIG. 10 is a flowchart showing the procedure of parallax adjustment performed by the projector according to the second embodiment.

The procedure of the parallax adjustment performed by the projector 1 according to the second embodiment will be described with reference to FIG. 10. The projector 1 first detects whether an inputted video signal contains two-dimensional video images or stereoscopic video image. When the projector 1 detects that the inputted video signal contains stereoscopic video images (S1; 3D), the projector 1 acquires the video image size of the stereoscopic video images (S2). The user information acquisition section 207 subsequently acquires user information (user's age) (S2a). The default value setting section 111 then refers to a depth adjustment value setting table created based on the user information and sets a default depth adjustment value based on the video image size acquired by the video image size acquisition section 103 (S3).

The following processes are the same as those in the first embodiment. In the projector 1, when the user has provided an input representing a change in the depth adjustment value (S4; Yes), the depth adjustment value is changed based on the input result (S5), and the parallax adjustment level is set based on the changed depth adjustment value (S6). The parallax level of the stereoscopic video images is then adjusted based on the thus set parallax adjustment level (S7), and the procedure is completed. On the other hand, in the projector 1, when the user has provided no input representing a change in the depth adjustment value (S4; No), the parallax adjustment level is set based on the default value of the depth adjustment value (S6), the parallax level of the stereoscopic video images is adjusted based on the thus set parallax adjustment level (S7), and the procedure is completed. The parallax adjustment according to the user's age (interpupillary distance) can thus be made.

As described above, according to the projector 1 of any of the above embodiments, the parallax level of stereoscopic video images is adjusted in accordance with the video image size, and the user can make further parallax adjustment.

In any of the above embodiments, the display method employed by the projector 1 is the liquid crystal display method using a liquid crystal light valve, but the display principle employed by the projector 1 is not limited thereto but may, for example, be a DMD-based (digital micromirror device) display method and a CRT-based (cathode ray tube) display method. Further, the invention is applicable to a television receiver and other video display apparatus as well as the projector 1.

The projector 1 according to any of the above embodiments, which includes a lamp as the light source 19, can alternatively use an LED (light emitting diode) light source, a laser or any other solid-state light source, or any other suitable light source.

The entire disclosure of Japanese Patent Application No. 2012-61795, filed Mar. 19, 2012 is expressly incorporated by reference herein.

What is claimed is:

1. A video display apparatus comprising:
a video image size acquisition section that acquires a video image size of stereoscopic video images;
a default value setting section that sets a default value of a parallax level adjustment value for adjusting a parallax level of the stereoscopic video images based on the acquired video image size;
an adjustment value changing section that changes the parallax level adjustment value from the default value;
a parallax adjustment level setting section that sets a parallax adjustment level of the stereoscopic video images based on the parallax level adjustment value; and
a parallax level adjustment section that adjusts the parallax level of the stereoscopic video images based on the set parallax adjustment level;
wherein the default value setting section sets the default value in such a way that the parallax level decreases when the acquired video image size exceeds a predetermined threshold; and
wherein the threshold is a value according to which whether or not the parallax level exceeds an interpupillary distance is determined.

2. The video display apparatus according to claim 1,
further comprising a user information acquisition section that acquires user information on a user,
wherein the default value setting section sets the default value based on the acquired video image size and the acquired user information.

3. A video display method comprising:
acquiring a video image size of stereoscopic video images;
setting a default value of a parallax level adjustment value for adjusting a parallax level of the stereoscopic video images based on the acquired video image size;
changing the parallax level adjustment value from the default value;
setting a parallax adjustment level of the stereoscopic video images based on the parallax level adjustment value; and
adjusting the parallax level of the stereoscopic video images based on the set parallax adjustment level;
wherein the default value is set in such a way that the parallax level decreases when the acquired video image size exceeds a predetermined threshold; and
wherein the threshold is a value according to which whether or not the parallax level exceeds an interpupillary distance is determined.

* * * * *